US007040687B2

(12) United States Patent
Ishibashi et al.

(10) Patent No.: US 7,040,687 B2
(45) Date of Patent: May 9, 2006

(54) CONSTRUCTION MACHINE WITH DOOR LOCKING DEVICE

(75) Inventors: Chuichi Ishibashi, Hiroshima (JP); Yoshiaki Murakami, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 10/639,627

(22) Filed: Aug. 13, 2003

(65) Prior Publication Data

US 2004/0041410 A1 Mar. 4, 2004

(30) Foreign Application Priority Data

Aug. 29, 2002 (JP) ............................ 2002-251939

(51) Int. Cl.
*B60J 5/04* (2006.01)
*E05D 15/32* (2006.01)

(52) U.S. Cl. ............................ 296/146.12; 296/190.11; 49/246

(58) Field of Classification Search ..................... None
See application file for complete search history.

(56) References Cited

U.S. PATENT DOCUMENTS

| | | | | |
|---|---|---|---|---|
| 4,049,305 | A * | 9/1977 | Zetterlund et al. | 292/336.3 |
| 4,945,677 | A * | 8/1990 | Kramer | 49/210 |
| 6,030,024 | A * | 2/2000 | Schmidhuber et al. | 296/146.12 |
| 6,101,853 | A | 8/2000 | Herr | |
| 6,183,039 | B1 * | 2/2001 | Kohut et al. | 296/155 |
| 6,382,705 | B1 * | 5/2002 | Lang et al. | 296/146.12 |
| 6,416,092 | B1 * | 7/2002 | Rathmann | 292/336.3 |
| 6,715,806 | B1 * | 4/2004 | Arlt et al. | 292/201 |

FOREIGN PATENT DOCUMENTS

| | | |
|---|---|---|
| EP | 0 987 390 A1 | 3/2000 |
| EP | 1 001 094 A1 | 5/2000 |
| JP | 4-134567 | 12/1992 |
| JP | 5-3550 | 1/1993 |
| JP | 7-180183 | 7/1995 |
| JP | 8-13883 | 1/1996 |
| JP | 8-312220 | 11/1996 |
| JP | 11-286963 | 10/1999 |
| JP | 2000-234463 | 8/2000 |
| JP | 2001-113946 | 4/2001 |

OTHER PUBLICATIONS

Derwent Publications, AN 1997-062783, XP-002263781, JP 08-312220, Nov. 26, 1996.

* cited by examiner

*Primary Examiner*—Patricia L. Engle
*Assistant Examiner*—Greg Blankenship
(74) *Attorney, Agent, or Firm*—Oblon, Spivak, McClelland, Maier & Neustadt, P.C.

(57) ABSTRACT

This invention provides with a construction machine having a door-locking device comprising a door lock upon closing a door including two sets of locking mechanisms and door strikers mounted on front and rear sides of the door in which the locking mechanisms and door strikers are engaged with each other respectively so as to lock the door, whereby capable of making the door secured to a cabin body firmly without jounce.

3 Claims, 3 Drawing Sheets

CONSTRUCTION MACHINE WITH DOOR LOCKING DEVICE

BACKGROUND OF THE INVENTION

1. Field of the Invention

This invention relates to a construction machine with a locking device for a door capable of opening and closing an opening of its cabin.

2. Description of the Related Art

In a door opening and closing system for a door provided with an opening of a cabin body, a link type door is supported by links and can be opened and closed through a rotational movement forward and backward of the links.

In this type door, when the door is closed, a locking mechanism provided on a front side of the door is coupled with a door striker provided on a front edge of the cabin body wherein the locking mechanism corresponds with the door striker upon locking. As a result, the door is locked.

There is a disadvantage that, during a work involving thumping vibrations, troublesome noise occurs by a jounce of a rear side of the door even in a locked state, however, since the door is locked only by its front side. Large extent of the jounce may cause the door or the cabin body to be deformed or broken.

SUMMARY OF THE INVENTION

The present invention has an object to provide a construction machine with a door-locking device capable of obtaining jounce-free, stable secured state of the door in a locked state.

A construction machine with a door-locking device of the present invention comprises a cabin, a door mounted on the cabin to be adapted to be movable between a closing position for fully closing an opening of the cabin and an opening position for fully opening the opening, a link adapted to support the door, one end of the link being pivotally connected to a body of the cabin and the other end or an opposite end of the link being pivotally connected to the door, and a door lock upon closing the door for locking the door at the closing position, wherein the door lock comprises two sets of locking mechanisms and door strikers mounted on front and rear sides respectively of the door.

According to the present invention, the door can be locked equally in balance in a position of both front and rear sides of the door by the door lock upon closing the door. Accordingly, as a whole, the door can be secured to the body of the cabin firmly without jouncing.

DESCRIPTION OF THE PREFERRED EMBODIMENTS

A door locking device according to an embodiment of the present invention is described hereinunder with reference to FIGS. 1 to 5. It is to be understood that the invention is not limited only to the following embodiment.

Figure 1:
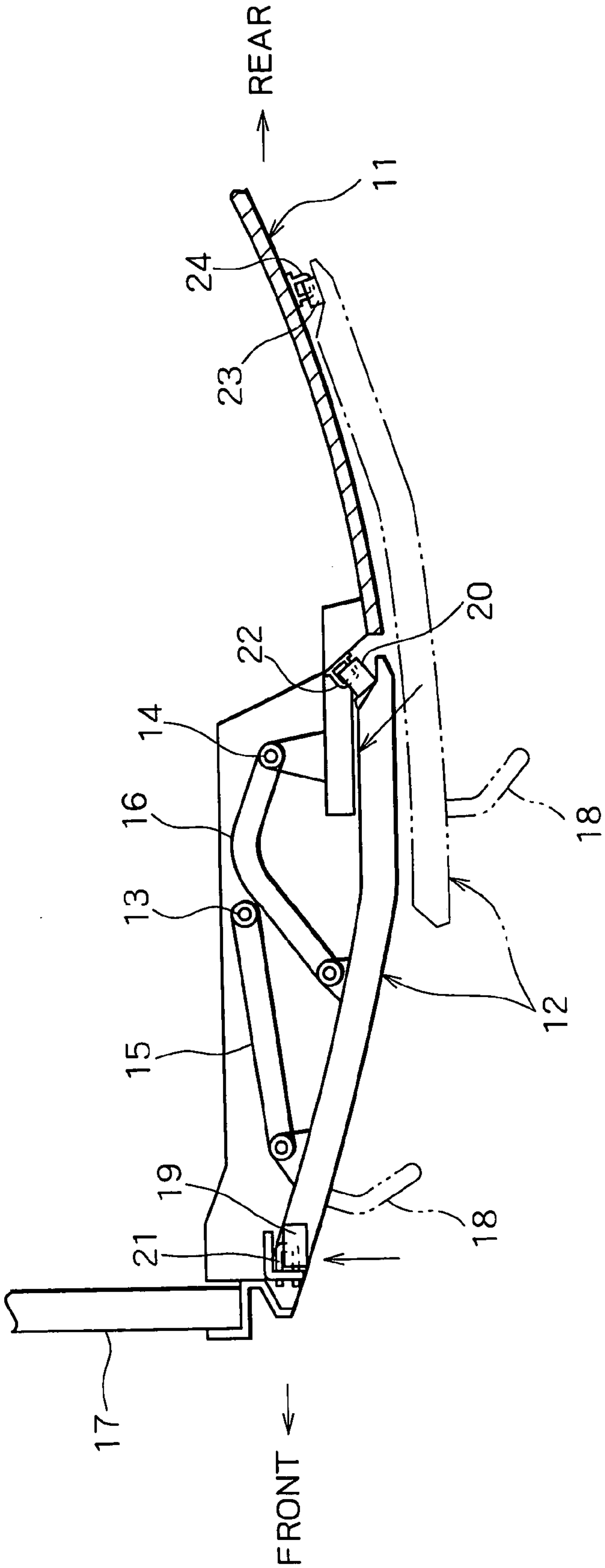
FIG. 1 is a horizontal sectional view of a door portion according to an embodiment of the present invention.

FIG. 1 is a horizontal sectional view of a door portion according to an embodiment of the present invention. In the same figure, the numeral 11 denotes a cabin body (a body of a cabin), numeral 12 denotes a door for opening and closing an opening of the cabin body 11, numeral 17 denotes a front window of the cabin, and numeral 18 denotes an opening/closing handle for door opening and closing operation. The opening acts as entrance thorough which an operator gets on and off the cabin.

The door 12 is supported by a pair of links 15 and 16 and at two positions of both upper and lower sides of the door, the links 15 and 16 being adapted to pivot forward and backward on vertical shafts 13 and 14 as rotation axis, respectively. One ends of the links 15 and 16 are mounted pivotably to the cabin body side, while opposite ends thereof are mounted pivotably to the door side. With pivotal motions of the links 15 and 16, the door 12 is movable between a closing position indicated with a solid line and an opening position indicated with a dash-double dot line in FIG. 1. As a result of such movement of the door 12, there is performed a door opening or closing operation.

At an intermediate position in the height direction of the door 12, a front locking mechanism 19 and a rear locking mechanism 20 are mounted on a front end side and a rear end side, respectively. At a front edge of the cabin body 11 is provided a front door striker 21 which is U-shaped like a gate, while at a rear edge of the cabin body is provided a rear door striker 22 as well as the front door striker. The locking mechanisms 19, 20 and the strikers 21, 22 constitute a closing lock as door lock for locking the door in its closing position. The locking mechanism 19, 20 act respectively as striker receiving member capable of catching the strikers.

Further, an opening lock as door lock for locking the door 12 in its opening position is constituted by an opening locking mechanism 23 and a opening striker 24 as well as the strikers 21, 22. Both such locks are hereinafter referred to also as lock means, provided a construction having the function and effect of the locking device in the present invention is included in the scope of protection of the present invention. The opening locking mechanism 23 is positioned below the closing rear locking mechanism 20 which is disposed at the rear end of the vertically intermediate portion of the door 12. On the other hand, the opening striker 24 is disposed on an exterior surface located behind the opening of the cabin body 11.

Both closing and opening lock means (the locking mechanisms 19, 20, 23 and the strikers 21, 22, 24) are of the same construction and perform the same locking and unlocking operations.

The construction and operation of the lock means is described below with reference to FIGS. 2 to 4.

Figure 2:
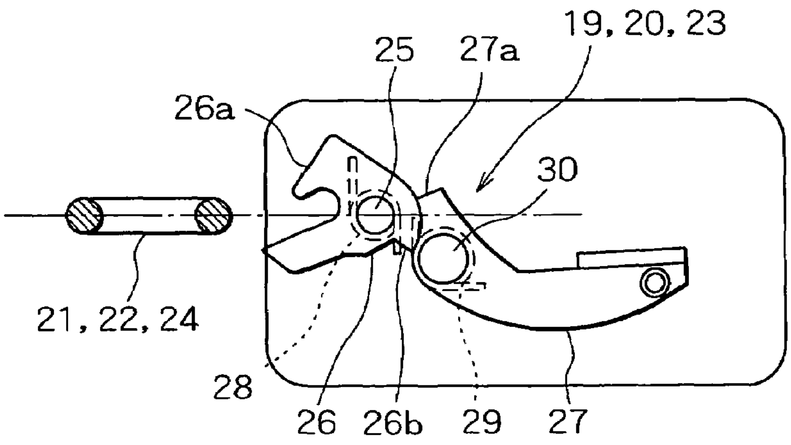
FIG. 2 is a view showing an unlocked state of a locking mechanism of the embodiment.
Figure 3:
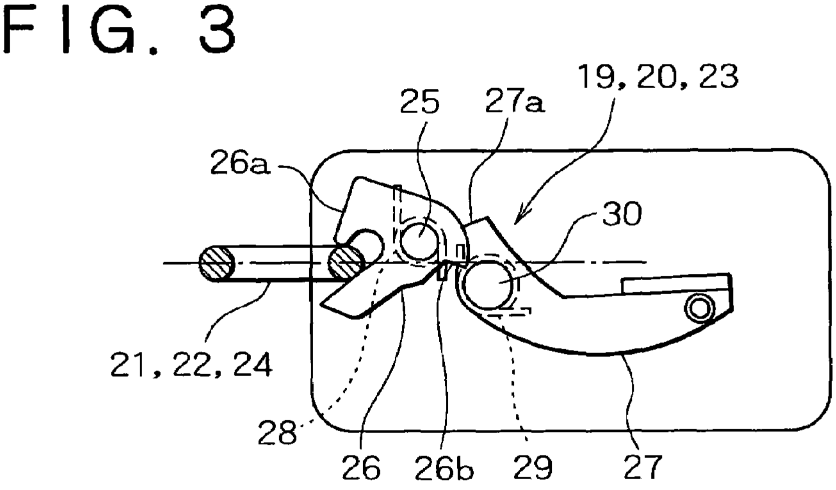
FIG. 3 is a view showing a state that the locking mechanism is about to be locked.
Figure 4:
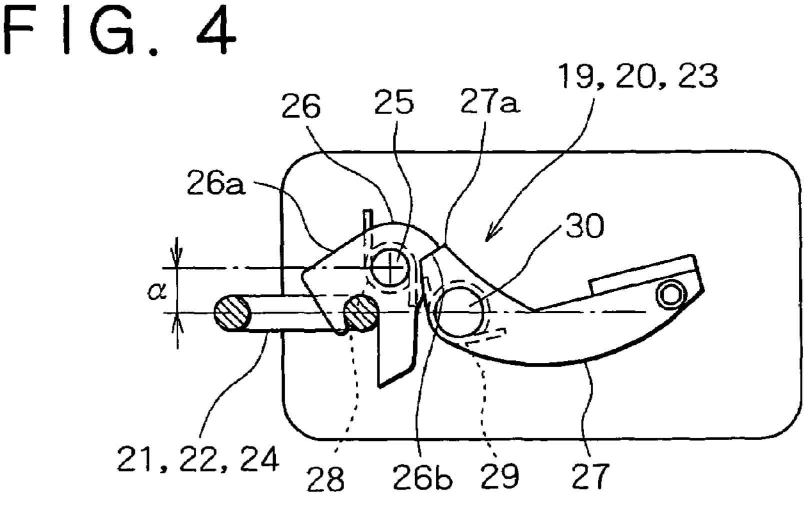
FIG. 4 is a view showing a locked state.

The locking mechanisms 19, 20, and 23 are each provided with a locking member 26, a lock lever 27, a first helical spring 28, and a second helical spring 29 (indicated with a dotted line in FIGS. 2 to 4). The locking member 26 is adapted to pivot about a locking center shaft 25 as rotation axis which extends in the vertical direction. The lock lever 27 has a function of holding the locking member 26 in a locked position. The first helical spring 28 has a function of holding the locking member 26 in an original position shown in FIG. 2. The second helical spring 29 has a function of urging the lock lever 27 toward a locked position shown in FIG. 4.

The locking member 26 is provided with an engaging portion 26_a_ which is bifurcated or forked and is further provided with a stepped or stepwise retaining portion 26*b* at a position spaced a predetermined angle circumferentially from the engaging portion 26*a*. A stopper portion 27*a* of the lock lever 27 comes into engagement with and disengagement from the retaining portion 26*b*.

FIG. 2 shows a state before locked or an unlocked state. More specifically, FIG. 2 shows in what positional relation the engaging portion 26*a* of the locking member 26 faces (confronts) each one of the strikers 21, 22, and 24. In this state, the stopper portion 27*a* of the lock lever 27 is in abutment against an outer peripheral surface portion of the locking member 26 other than the retaining portion 26*b*.

In this state, if the door 12 is closed (or opened), as shown in FIG. 3, the engaging portion 26 of the locking member 26 comes into engagement with each one of the strikers 21, 22, and 24. At this time, the engaging portion 26*a* rotates at a predetermined angle (a little smaller than 90°) in the counterclockwise direction in the figure while embracing the striker, so that, as shown in FIG. 4, the lock lever 27 rotates about a lever shaft 30 and the stopper portion 27*a* is engaged with the retaining portion 26*b* of the locking member 26.

As a result, the locking member 26 is held in a state in which it bites the associated one of the strikers 21, 22, and 24, and the door 12 is locked to its closing position (or opening position).

Thus, on both front and rear sides of the door 12, there are provided the closing locking mechanisms 19 and 20 and the strikers 21 and 22 for engagement therewith. With this construction wherein the door 12 is locked uniformly on both front and rear sides of the door, the whole of the door 12 can be fixed to the cabin body 11 firmly without jounce.

As the locking member 26 rotates while biting the associated one of the strikers 21, 22, and 24, as shown in FIGS. 2 to 4, the locking mechanisms 19, 20, and 23 as a whole are attracted or drawn toward the inside of the cabin. In FIG. 4, $\alpha$ represents the amount of this attracting force.

This attracting force acts on the whole of the door 12 through the locking mechanisms 19 and 20. Consequently, the door 12, in its closed state, is fixed or secured more firmly to the cabin body 11. Therefore, even during a work involving vigorous vibrations, there is no fear of jounce of the door 12.

Moreover, when the door is closed, the rear side of the door is also attracted inwards of the cabin with an attracting force, the attracting force being exerted inwards of the cabin and acting on the front locking mechanism 19 (the front side of the door) located close to the opening/closing handle 18 in FIG. 1 which serves as an operating force point. Consequently, the rear locking mechanism 20 remote from the operating force point also engages with the rear striker 22 smoothly and positively.

The locked state of the door by the locking mechanisms 19, 20, and 23 can be released or unlocked by rotating the lock lever 27 clockwise about the lever shaft 30 from its state shown in FIG. 4 to disengage the stopper portion 27*a* from the retaining portion 26*b*.

An unlocking mechanism for unlocking the locking mechanisms 19, 20, and 23 all together is described below with reference to FIG. 5.

Each lock can be released with an unlocking handle 31 which an operator can operate while sitting on an operator seat. The handle 31 is disposed at an intermediate position in the height direction (vertical direction) of the door 12 and in the front portion of the door. The handle 31 is mounted pivotably in a forward and backward direction about an intermediate pivot shaft 32 as rotation axis. An operating force of the handle 31 is transmitted through a link type interlocking system 33 to both front and rear locking mechanisms 19, 20 for closing and also to the locking mechanism 23 for opening.

The interlocking system 33 comprises a relay link 35, a transmission plate 37, a first connecting link 38, a second connecting link 39, a third connecting link 40, a fourth connecting link 41, and a fifth connecting link 42.

The relay link 35 is mounted at a longitudinally intermediate position so as to be pivotable longitudinally about a shaft 34. The transmission plate 37 is mounted in the rear portion of the door so as to be pivotable vertically about a shaft 36. The first connecting link 38 connects a lower end portion of the handle 31 with a lower portion of the relay link 35. The second link 39 connects an upper end portion of the relay link 35 with the lock lever 27 (not shown in FIG. 5 as is the case with the other locking mechanisms 20 and 23) of the front locking mechanism 19 for closing. The third connecting link 40 connects a lower end portion of the relay link 35 with an operating force point (a power point) of the transmission plate 37. The fourth connecting link 41 connects one operating point portion (one working point portion) of the transmission plate 37 with the lock lever 27 of the rear locking mechanism 20 for closing. The fifth connecting link 42 connects the other operating point portion of the transmission plate 37 with the lock levers 27 of the locking mechanism 23 for opening.

Figure 5:
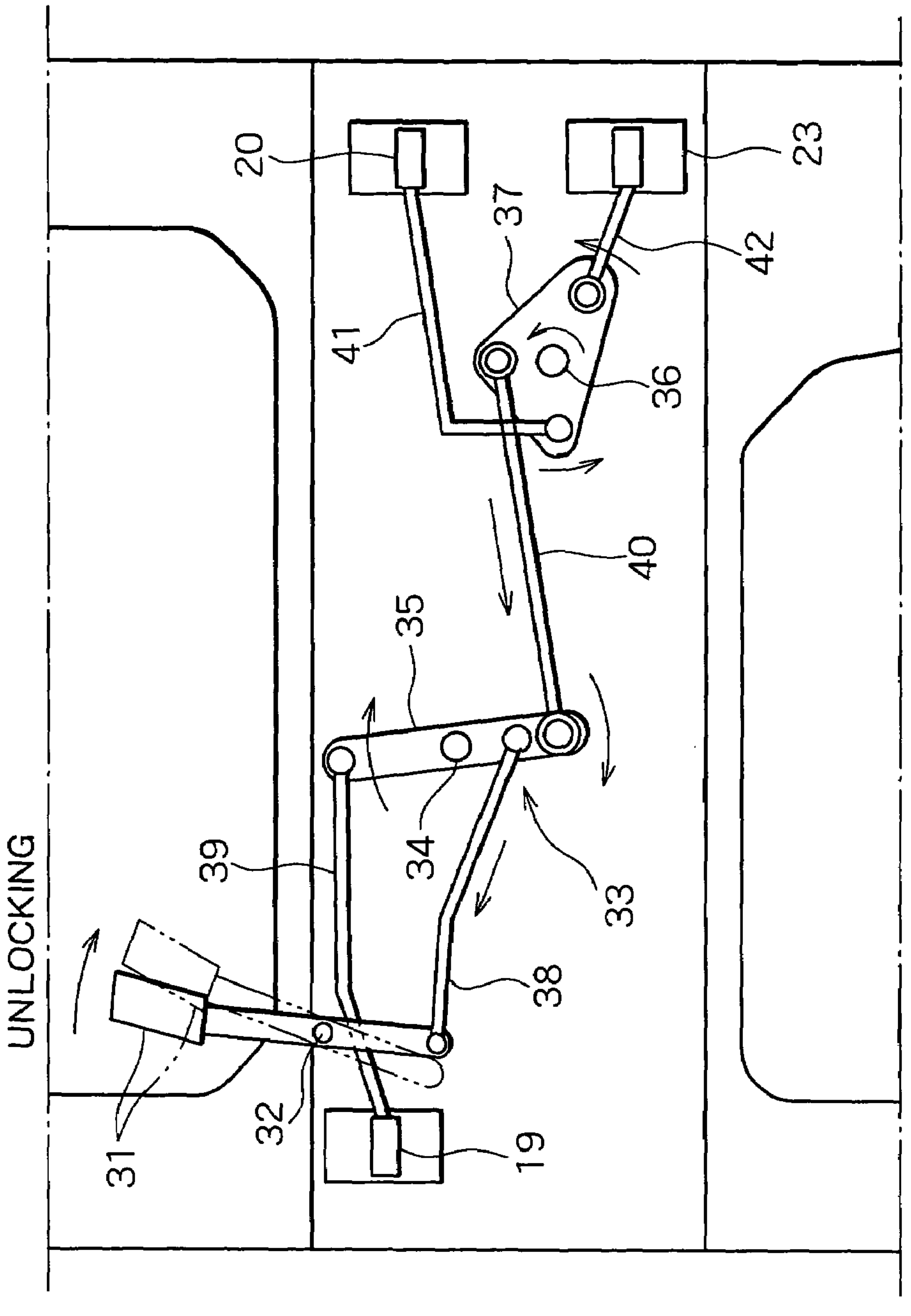
FIG. 5 is a sectional view showing an unlocking mechanism for unlocking the locking mechanism.

With the door 12 closed and locked, if the unlocking handle 31 is operated rearwards as indicated with a dash-double dot line in FIG. 5, this operating force is transmitted as an unlocking force virtually simultaneously to the lock levers 27 of the locking mechanisms 19, 20, and 23 through the relay link 35, transmission plate 37 and connecting links 38~42, whereby the locking mechanisms 19, 20, and 23 are unlocked.

Even after the operator has let go of the unlocking handle 31, the interlocking mechanism 33 is held in its unlocking position indicated with a dash-double dot line in FIG. 5.

In each of the locking mechanisms 19, 20, and 23, even if the lock lever 27 turns clockwise by the above unlocking operation to release (unlock) the locking member 26 from the locked state shown in FIG. 4, the locking member 26 remains engaged with the associated one of the strikers 21, 22, and 24. In this state, when the door 12 is operated in its opening or closing direction, the locking member 26 reverts to its original position shown in FIG. 2.

Thus, both front and rear locking mechanisms 19 and 20 for closing can be unlocked simultaneously by operation of a single unlocking handle 31, and hence the unlocking operation is simplified.

Besides, the locking mechanism 23 for opening can also be unlocked by operation of the same handle 31, thus eliminating the need for providing an unlocking means exclusive for opening. Consequently, the unlocking structure can be simplified and reduced in size, also permitting the reduction of cost. Additionally, unlike the provision of separate handles, there is no fear of erroneous operation between closing lock and opening lock.

The locking mechanisms 19, 20, and 23 are not limited to those illustrated in the above embodiment, but various other structures may be adopted. The adoption of locking mechanisms having a function of attracting the door 12 inwards of the cabin when lock is fastened, is preferable because the door holding function can be further improved.

According to the present invention, as set forth above, in a construction machine including a door mounted in a cabin body, the door, while being supported by links, being movable with pivotal motions of the links between a closing position for closing an opening of the cabin body and an opening position for opening the opening, the opening of the door being done with backward movement of the door from the closing position along an outer side face located on the opening side of the cabin body, there is provided a closing lock means which locks the door automatically at the closing position, the closing lock means being constructed such that both front and rear sides of the door are fixed to the cabin body by engagement of locking mechanisms disposed on both front and rear sides of the door with door strikers.

Preferably, the front and rear locking mechanisms in the closing lock means are each provided with a locking member which engages a door striker at the door closing position to fix the door in an attracted state inside the cabin and also provided with a lock lever for holding the locking member at the engaged position.

In this case, since the locking members in both front and rear locking mechanisms come into engagement with the door strikers on the cabin body side and fix the door in an attracted state inside the cabin, it is possible to let the door come closely into contact with the cabin body (edge portion of the opening) and keep the door in a jounce-free, stable fixed state.

The opening/closing handle which serves as an operating force point when operating the door in its closing direction is disposed on the front side, so that the engagement between the front locking member and the door striker in the vicinity of this operating force point is effected positively with a sufficient operating force. This is in contrast with the rear side remote from the operating force point on which side is not directly exerted the operating force and so there is the possibility that the locking member-striker engagement may not be done smoothly even in the presence of a slight deflection or the like of the door.

On this regard, since the whole of the door is attracted inwards (inside) of the cabin with an attracting force induced by both the front locking member and door striker, there are attained the following effects. With this door attracting action, the locking member in the door rear-side locking mechanism remote from the opening/closing handle which serves as an operating force point in opening/closing operation comes into smooth and positive engagement with the associated door striker. Further, with this door attracting force, it is possible to bring the door into close contact with the cabin body and obtain jounce-free, stable fixed state of the door.

It is preferable that the lock levers of both front and rear locking mechanisms be connected with each other through an interlocking mechanism and that there be provided an unlocking handle which unlocks the lock levers of both locking mechanisms virtually simultaneously through the interlocking mechanism.

In this case, since an operating force of one unlocking handle is transmitted to both front and rear locking mechanisms through the interlocking mechanism to unlock both locking mechanisms at a time, the unlocking operation is simplified.

Preferably, as opening lock means for fixing the door to the cabin body at its opening position, a door striker is mounted on an outer side face of the cabin body, while on the door side is mounted an opening locking mechanism having a locking member for engagement with the door striker and also having a lock lever for holding the locking member at the engaged position, the lock lever in the opening locking mechanism being connected to the interlocking mechanism for interlock with lock levers of both front and rear locking mechanisms in the closing lock means to effect an unlocking operation.

In this case, the locking mechanism of the opening lock means for fixing the door in the opening position is connected to the interlocking mechanism in the closing lock means, and release of the locked state in the opening position is also effected by the same unlocking handle. Therefore, it is no longer required to use any special unlocking means exclusively for opening. As a result, not only the unlocking structure for the entire door is simplified and is reduced in both size and cost, but also there is no fear of erroneous operation between closing lock and opening lock.

More than two sets of locking mechanisms and door strikers can be mounted on the door if necessary.

Although an embodiment of the present invention has been described above, the scope of protection of the present invention is not limited thereto.

We claim:

1. A construction machine with a door locking device, comprising:

a cabin;

a door mounted on said cabin to be adapted to be movable between a closing position for fully closing an opening of said cabin and an opening position for fully opening said opening;

a link adapted to support said door, one end of said link being pivotally connected to a body of said cabin and the other end of said link pivotally connected to said door;

a door lock upon closing said door for locking said door at said closing position, said door lock comprising two sets of locking mechanisms and door strikers mounted on front and rear sides respectively of said door, wherein each of said locking mechanisms at the closing position comprises a locking member adapted to engage with one of said door strikers at the closing position to secure the door in such a manner that the door is drawn inside said cabin, and a lock lever for holding said locking member in an engaged position where the locking member engages with said one of the door strikers; and an additional door lock upon opening said door for securing said door to the body of said cabin at the opening position.

2. The construction machine according to claim 1, further comprising-an interlocking system connected to said lock lever in each of said locking mechanisms, and an unlocking handle for unlocking the lock lever in each of said locking mechanisms virtually simultaneously through said interlocking system.

3. The construction machine according to claim 2, wherein said additional door lock comprises a door striker provided on an exterior surface of the body of the cabin and an additional locking mechanism, said additional locking mechanism comprising a locking member mounted on said door and adapted to engage with said door striker and a lock lever for holding said locking member in an engaged position where the locking member engages with said door striker, wherein said lock lever in said additional locking mechanism is connected to said interlocking system in such a manner that said lock lever in said additional locking mechanism works with the lock lever in each of said locking mechanisms at the closing position so as to release both said locking mechanisms and said additional locking mechanism.

* * * * *